United States Patent
Fender et al.

(10) Patent No.: US 11,704,317 B2
(45) Date of Patent: Jul. 18, 2023

(54) PARTIAL GROUP BY FOR EAGER GROUP BY PLACEMENT QUERY PLANS

(71) Applicant: Oracle International Corporation, Redwood Shores, CA (US)

(72) Inventors: Pit Fender, Union City, CA (US); Benjamin Schlegel, Merced, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2 days.

(21) Appl. No.: 16/797,507

(22) Filed: Feb. 21, 2020

(65) Prior Publication Data

US 2021/0263930 A1    Aug. 26, 2021

(51) Int. Cl.
*G06F 16/00* (2019.01)
*G06F 16/2453* (2019.01)
*G06F 12/12* (2016.01)
*G06F 16/2455* (2019.01)

(52) U.S. Cl.
CPC ........ *G06F 16/24542* (2019.01); *G06F 12/12* (2013.01); *G06F 16/24552* (2019.01); *G06F 16/24556* (2019.01)

(58) Field of Classification Search
CPC .............. G06F 16/24542; G06F 12/12; G06F 16/24552; G06F 16/24556
USPC .................................................. 707/600–899
See application file for complete search history.

(56) References Cited

U.S. PATENT DOCUMENTS

| 5,598,559 | A | 1/1997 | Chaudhuri |
| 5,897,632 | A | 4/1999 | Dar et al. |
| 6,535,872 | B1* | 3/2003 | Castelli ................. G06F 16/248 |
| 7,379,933 | B1 | 5/2008 | Witkowski et al. |
| 10,740,333 | B1 | 8/2020 | Betawadkar-Norwood et al. |
| 11,099,902 | B1* | 8/2021 | Matthews .............. G06N 20/00 |
| 2008/0306903 | A1* | 12/2008 | Larson ................ G06F 16/2462 |
| 2009/0055349 | A1 | 2/2009 | Ahmed |
| 2009/0055350 | A1 | 2/2009 | Branish, II et al. |
| 2015/0234888 | A1 | 8/2015 | Ahmed et al. |
| 2015/0293968 | A1* | 10/2015 | Dickie .................. G06F 16/244 |
| | | | 707/738 |
| 2016/0378827 | A1 | 12/2016 | Bondalapati et al. |
| 2017/0329823 | A1 | 11/2017 | Attaluri et al. |
| 2018/0018375 | A1 | 1/2018 | Brunel et al. |
| 2018/0018383 | A1 | 1/2018 | Brunel et al. |

(Continued)

OTHER PUBLICATIONS

Weipeng P. Yan and Per-Ake Larson. "Eager Aggregation and Lazy Aggregation", VLDB 1995, 13 pages.

(Continued)

*Primary Examiner* — Irete F Ehichioya
*Assistant Examiner* — Shirley D Hicks
(74) *Attorney, Agent, or Firm* — Hickman Becker Bingham Ledesma LLP

(57) ABSTRACT

A partial group by operator is a group by operator that implements a fallback mechanism. The fallback mechanism is triggered whenever memory pressure reaches a certain threshold. When the fallback mechanism is triggered, a row is included in an output of the partial group by operator without including an aggregation value for a grouping value for the row to an aggregation data structure. A final group by operator computes a final aggregate value of all results, including pre-grouped results and passed through results, from the partial group by operator.

18 Claims, 4 Drawing Sheets

(56) References Cited

U.S. PATENT DOCUMENTS

| | | |
|---|---|---|
| 2020/0372029 A1 | 11/2020 | Betawadkar-Norwood et al. |
| 2020/0401581 A1 | 12/2020 | Eubank et al. |
| 2022/0164340 A1 | 5/2022 | Pasupuleti |
| 2022/0164353 A1 | 5/2022 | Pasupuleti |

OTHER PUBLICATIONS

S. Chaudhuri and K. Shim. "Including group-by in query optimization", VLDB dated 1994, 13 pages.

M. Eich, P. Fender and G. Moerkotte. "Faster Plan Generation through Consideration of Functional Dependencies and Keys", PVLDB, vol. 9, dated 2016, 12 pages.

M. Eich, G. Moerkotte. "Dynamic programming: The next step.", ICDE dated 2015, 45 pages.

G. Lohman. "Is query optimization a solved problem?" http://wp.sigmod.org/?p=1075, dated 2014, 6 pages.

A. Gupta, V. Harinarayan and D. Quass. "Aggregate-Query Processing in Data Warehousing Environments", VLDB dated1995, 12 pages.

Pasupuleti, U.S. Appl. No. 17/105,268, filed Nov. 25, 2020, Non-Final Rejection, dated May 12, 2022.

Pasupuleti, U.S. Appl. No. 17/105,255, filed Nov. 25, 2020, Notice of Allowance and Fees Due, dated Jul. 15, 2022.

Pasupuleti, U.S. Appl. No. 17/105,255, filed Nov. 25, 2020, Notice of Allowance and Fees Due, dated May 20, 2022.

Pasupuleti, U.S. Appl. No. 17/105,255, filed Nov. 25, 2020, Notice of Allowance and Fees Due, dated May 9, 2022.

Pasupuleti, U.S. Appl. No. 17/105,255, filed Nov. 25, 2020, Non-Final Rejection, dated Feb. 3, 2022.

\* cited by examiner

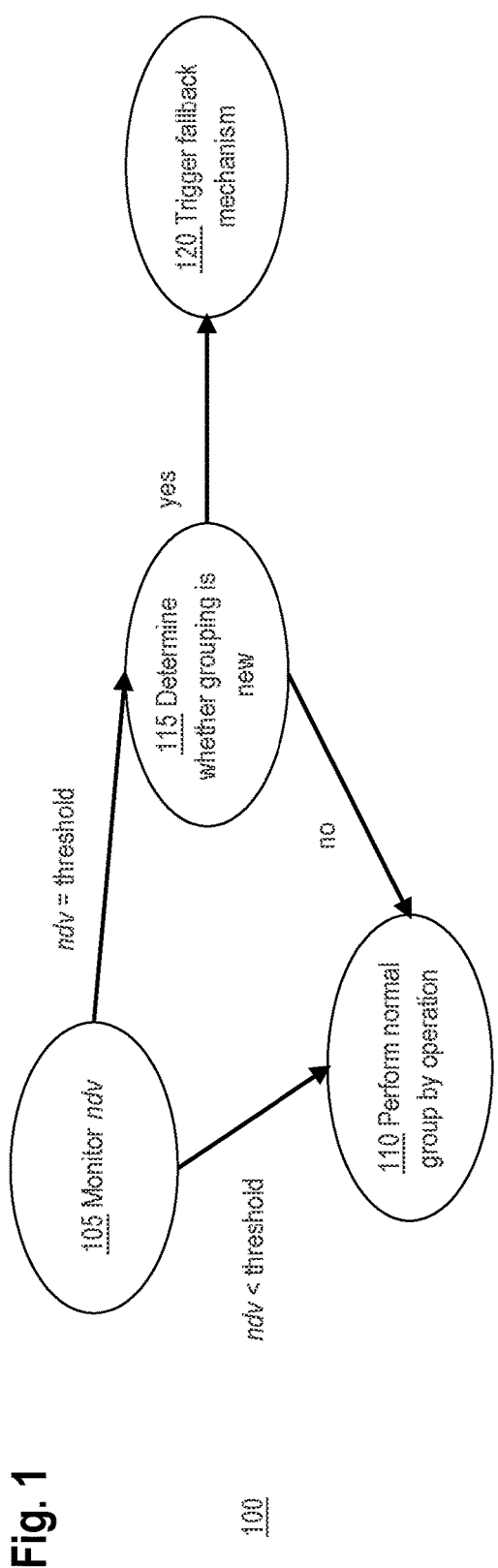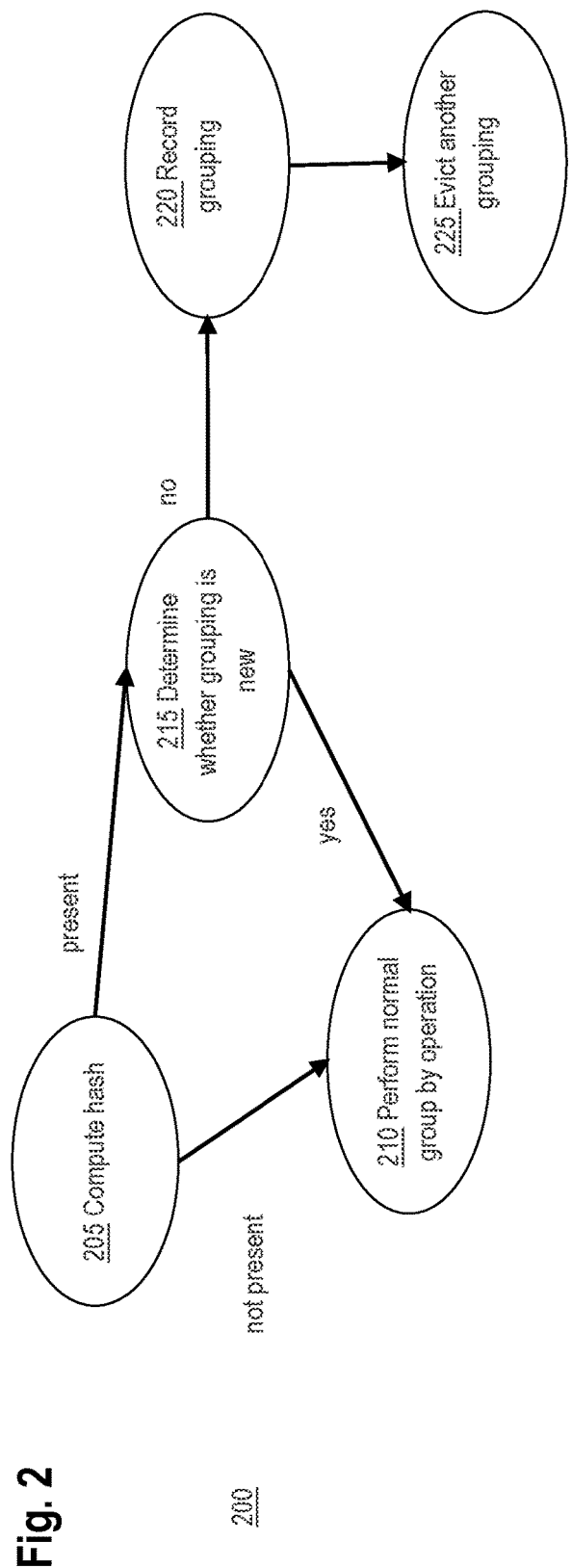

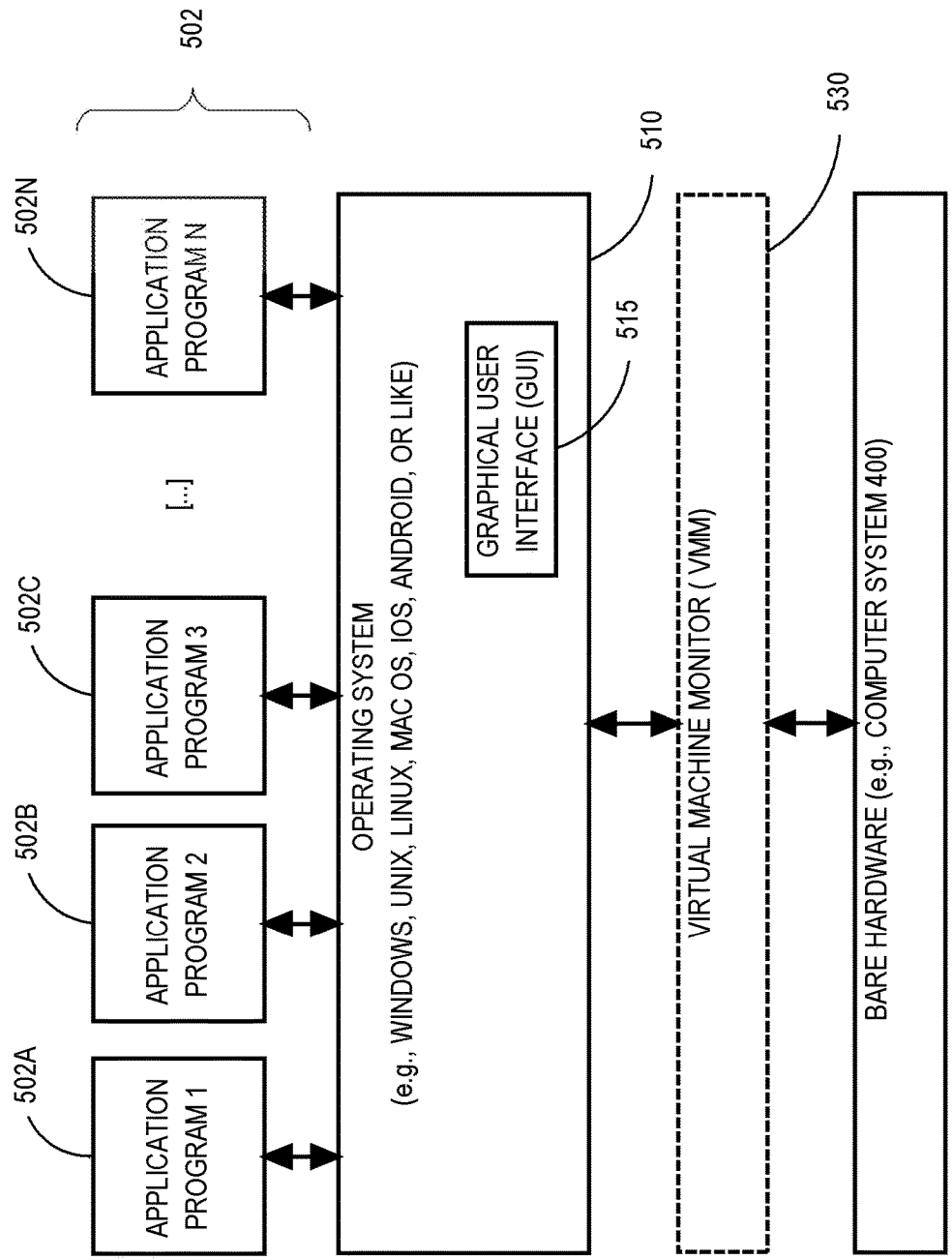

PARTIAL GROUP BY FOR EAGER GROUP BY PLACEMENT QUERY PLANS

FIELD OF THE INVENTION

The present disclosure relates to the field of database systems, and in particular to partial group by for Eager Group By placement query plans.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Relational database system implementations may apply Eager Group By placement strategies that split a group by operation into two or more group by operations. Splitting a group by operation into two or more group by operations pre-aggregates intermediate results in order to reduce the input cardinality to join operations. A final group by operation after the join then computes the final aggregate values.

A database optimizer explores the whole search space of these transformations to find the cheapest and most efficient query execution plan. Since query optimizers are cost-based, they rely on cardinality estimates. Unfortunately, the cardinality estimates are often to inaccurate and, hence, misleading to well differentiate between the cross product of those possible query transformations.

Dynamic programming-based query optimization algorithms curtail the search space of those transformations by mapping SQL query to a hypergraph. However, the Achilles heel of query optimization is the problem of cardinality estimation. Since accurate statistics are often not available for intermediate results, misestimation of the number of groupings is often a direct result. Column group estimates and sampling techniques can help soften the issue but are often not enough for the vast search space a query optimizer has to explore. Usage of functional dependencies to detect misestimations is not enough and can still lead to suboptimal plans.

Therefore, there is a need for a runtime solution for Eager Group By placement plans that reduce the risk of suboptimal Eager Group By placement plans.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 1 illustrates an exemplary execution process of a partial group by operator according to an embodiment.

FIG. 2 illustrates another exemplary execution process of a partial group by operator according to an embodiment.

FIG. 5 illustrates a block diagram of a basic software system for controlling the operation of a computing device.

DETAILED DESCRIPTION

Figure 3:
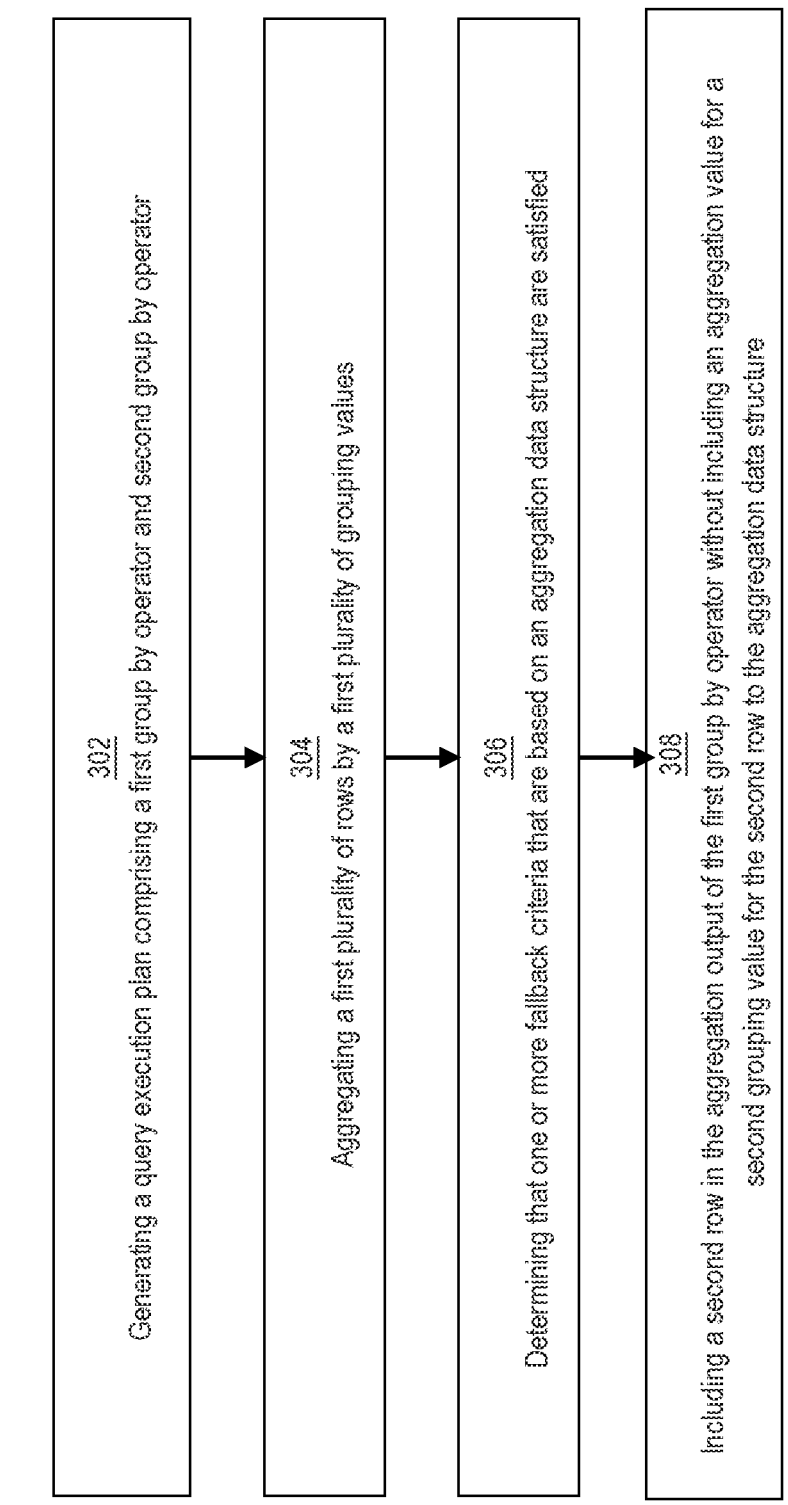
FIG. 3 illustrates a method of a partial group by operator according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Group by placement refers to an array of query transformation strategies. These transformation strategies involve pre-aggregating intermediate results by an eager group by operation in order to reduce the input cardinality to join operation. A final group by operation, after the join operation, then computes the final aggregate values.

A problem of placing multiple eager group by operations is that of the benefits may not justify the costs. That is, early group by operations incur additional costs but may not reduce the input cardinality to subsequent operations, like join and group by, substantially. If the number of distinct values of the grouping columns becomes too high, the group by operator may spill to disk. As a remedy, the group by operator may be applied in several runs. Therefore, the input range of grouping values is partitioned so that each partition can be fit into main memory. But, those type of group by are extremely expensive and should be avoided whenever possible.

Techniques describe herein implement a fallback mechanism, which allows an early group by to be switched to a partial group by whenever memory pressure reaches a threshold. The fallback mechanism guarantees that the early group by will incur only a slight overhead in a worst case scenario. Once the group by triggers the fallback mechanism, its execution overhead becomes minimal.

Query Optimization Overview

Query transformation is a set of techniques used by an optimizer to rewrite a query for optimization. A query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as a query execution plan (QEP). A QEP is a set of directives and metadata that is prepared for an execution engine.

As used herein, a query representation is "rewritten" when the representation represents a rewritten version of the query, after the query has been rewritten from a first version to a second version. A first version may be an original query or may be another version rewritten from the original query. Two query representations are semantically equivalent to each other when the two query representations, if executed, would produce equivalent result sets, even if the result sets are assembled in different manners by the two query representations.

TPC-H Benchmark Queries

The optimizer of the Oracle RDBMS employs Eager Group By placement for five (5) out of 23 the TPC-H Benchmark queries. TPC is a non-profit corporation founded to define transaction processing and database benchmarks and has developed and published specifications including decision support benchmarks, such as TPC-H. Cardinality misestimates can become very costly when an early group by operator suffers from too much memory pressure and starts spilling to disk.

However, as discussed elsewhere herein, employing a modified group by operation that implements a fallback mechanism, ensures that spilling to disk can be safely avoided. The modified group by operation benefits from all the advantages of Eager Group By placements but is free of the risks associated with those query transformations. In the best case, the modified group by operation will have the same performance benefits. In the worst case, the modified group by operation will incur only a slight run-time overhead. Moreover, in the case of a heavy skewed data distribution, a QEP that employs the modified group by comes ahead over a QEP that does not employ an eager group by.

There are different group by placement strategies used to transform five (5) TPC-H queries, including:

Single Coalesced Grouping (SCG), also referred to as Eager Group By;
Single Factored Grouping (SFG), also referred to as Eager Count; and
Combined Coalesced and Factored Grouping (CCFG), also referred to as Double Eager. Each of these different group by placement strategies are discussed below.

Single Coalesced Grouping (SCG)—Eager Group by

The Single Coalesced Grouping, also referred as Eager Group By Transformation, pushes a group by into a join and does a final pass over the result in a second group by operation after the join. The first group by is referred to as eager (or early or inner) group by, while the second group by is referred to as a final (or outer) group by. The first group by reduces the number of input rows to the join and, thus, reduces the input cardinality to the join, which should result into a cheaper join operation. The second group by merges or aggregates the pre-grouped results.

Table 1 shows how aggregation functions can be decomposed for the Eager Group By Transformation.

TABLE 1

Aggregation Functions for the Eager Group By Transformation

| Aggregation Function | Decomposed Aggregation Function |
| --- | --- |
| SUM(T · C) | SUM(SUM(T · C)) |
| COUNT(T · C) | SUM(COUNT(T · C)) |
| COUNT(*) | SUM(COUNT(*)) |
| AVG(T · C) | SUM(SUM(T · C))/SUM(COUNT(T · C)) |
| MAX(T · C) | MAX(MAX(T · C)) |
| MIN(T · C) | MIN(MIN(T · C)) |

The Eager Group By Transformation is beneficial for TPC-H Query 8. The original TPC-H Query 8 is shown in Table 2. The transformed TPC-H Query 8 is shown in Table 3.

TABLE 2

TPC-H Benchmark Query 8

```
SELECT    /* Q8 */ o_year,
          SUM(case when nation = 'BRAZIL' then volume else 0 end)
          / SUM(volume) as mkt_share
```

TABLE 2-continued

TPC-H Benchmark Query 8

```
FROM (SELECT   to_number (to_char(o_orderdate, 'yyyy')) as
               o_year,
               l_extendedprice * (1 – l_discount) as volume,
               n2.n_name as nation
       FROM    part, supplier, lineitem, orders, customer,
               nation n1, nation n2, region
       WHERE   p_partkey = l_partkey and s_suppkey = l_suppkey
               and l_orderkey = o_orderkey and o_custkey =
               c_custkey and c_nationkey = n1.n_nationkey
               and n1.n_regionkey = r_regionkey and r_name =
               'AMERICA' and s_nationkey = n2.n_nationkey
               and o_orderdate between
               to_date('1995-01-01', 'YYYY-MM-DD') and
               to_date('1996-12-31', 'YYYY-MM-DD')
               and p_type = 'ECONOMY_ANODIZED_STEEL')
               as all_nations
GROUP BY o_year
ORDER BY o_year
```

TABLE 3

TPC-H Benchmark Query 8 with SCG transformation applied

```
SELECT       /* Q8 SCG */ to_number(to_char(o_orderdate, 'yyyy'))
             as o_year, SUM(V.vol_a) / SUM(V.vol_b) as mkt_share
FROM region, nation n1, customer, orders,
     (SELECT /*+ no_merge */ l_orderkey,
             SUM(case when n2.n_name = 'BRAZIL'
                 then l_extendedprice * (1 – l_discount)
                 else 0 end) as vol_a,
             SUM(l_extendedprice * (1 – l_discount)) as vol_b
      FROM   part, supplier, lineitem, nation n2
      WHERE  p_partkey = l_partkey and s_suppkey = l_suppkey
             and s_nationkey = n2.n_nationkey
             and p_type = 'ECONOMY_ANODIZED_STEEL'
      GROUP BY l_orderkey) V
WHERE    n1.n_regionkey = r_regionkey and c_nationkey =
         n1.n_nationkey and o_custkey = c_custkey and
         V.l_orderkey = o_orderkey and r_name = 'AMERICA'
         and o_orderdate between
         to_date('1995-01-01', 'YYYY-MM-DD') and
         to_date('1996-12-31', 'YYYY-MM-DD')
GROUP BY to_number(to_char(o_orderdate, 'yyyy'))
ORDER BY to_number(to_char(o_orderdate, 'yyyy'))
```

The following are observed of Query 8 from Tables 2 and 3:

Query blocks

The original Query 8, shown in Table 2, references the tables part, supplier, lineitem, orders, customer, nation n1, nation n2 and region in one query block.

The transformed Query 8, shown in Table 3, has an inner query block that references part, supplier, lineitem, nation n2. The outer query block joins the inner query block with the tables orders, customer, nation n1, region.

Decomposed aggregation function

The original aggregation function of the original Query 8 is SUM (case when nation='BRAZIL' then volume else 0 end)/SUM (volume).

It gets decomposed into SUM(SUM(case when n2.n name='BRAZIL' then volume else 0 end)/SUM (SUM(volume)), in the transformed Query 8.

Another candidate for the Eager Group By Transformation is TPC-H Query 10. The original TPC-H Query 10 is shown in Table 4. The transformed TPC-H Query 10 is shown in Table 5.

TABLE 4

TPC-H Benchmark Query 10

```
SELECT     /* Q10 */ * FROM (
SELECT     c_custkey, c_name ,
           SUM(l_extendedprice * (1 – l_discount)) as revenue,
           c_acctbal, n_name, c_address, c_phone, c_comment
FROM customer, orders, nation, lineitem
WHERE c_custkey = o_custkey and l_orderkey = o_orderkey
      and o_orderdate >= to_date('1993-10-01','YYYY-MM-DD')
      and o_orderdate < add_months(to_date('1993-10-01', 'YYYY-
      MM-DD'), 3) and c_nationkey = n_nationkey
GROUP BY   c_custkey, c_name, c_acctbal, c_phone, n_name,
           c_address, c_comment
ORDER BY revenue desc)
WHERE ROWNUM <= 20
```

TABLE 5

TPC-H Benchmark Query 10 with SCG transformation applied

```
SELECT     /* Q10  SCG */ * FROM (
SELECT     c_custkey, c_name, c_acctbal, n_name, c_address,
           c_phone, c_comment, SUM(V.vsum) AS revenue
FROM customer, nation,
     (SELECT       /* + NO_MERGE */ o_custkey,
                   SUM(l_extendedprice * (1 – l_discount)) as vsum
      FROM         lineitem, orders
      WHERE        l_orderkey = o_orderkey and l_returnflag = 'R'
                   and o_orderdate >= to_date( '1993-10-01',
                   'YYYY-MM-DD')
                   and o_orderdate <
                       add_months(to_date( '1993-10-01',
                       'YYYY-MM-DD'), 3)
      GROUP BY o_custkey) V
WHERE c_custkey = V.o_custkey and c_nationkey = n_nationkey
GROUP BY   c_custkey, c_name, c_acctbal, c_phone, n_name,
           c_address, c_comment
ORDER BY revenue desc)
WHERE ROWNUM <= 20
```

The following are observed of Query 10 from Tables 4 and 5:

Query blocks
  The original Query 10, shown in Table 4, references the tables customer, orders, nation, lineitem in one query block.
  The transformed Query 10, shown in Table 5, has an inner query block that references lineitem and orders. The outer query block joins the inner query block with the tables customer and nation.
Decomposed aggregation function
  The original aggregation function of the original Query 10 is SUM(l_extendedprice*(1−l_discount)).
  It gets decomposed into SUM(SUM(l_extendedprice*(1−l_discount))), in the transformed Query 10.

Single Factored Grouping (SFG)—Eager Count

Eager Count Transformation, also referred to as Single Factored Grouping (SFG), performs eager aggregation on tables not containing aggregation columns. As the name implies, it counts the number of rows for each grouping of those tables during an early aggregation. After that, a join is applied. The join is followed with a group by operation that aggregates on the original aggregation columns. As before, the early group by is referred to as eager aggregation. The name Single Factored Grouping stems from the fact that the count for each group in the early aggregation is factored into the final computation of the aggregation.

Table 6 shows how aggregation functions can be decomposed for the Eager Count Transformation. Here, T refers to the input of the join that is not being pre-aggregated. The set V denotes the set of tables the early aggregation is applied on.

TABLE 6

Aggregation Functions for the Eager Count Transformation

| Aggregation Function | Decomposed Aggregation Function |
| --- | --- |
| SUM(T · C) | SUM(T · C * COUNT(V.*)) |
| COUNT(T · C) | SUM(COUNT(V.*)) |
| COUNT(*) | SUM(COUNT(V.*)) |
| AVG(T · C) | SUM(T · C * COUNT(V.*))/SUM(COUNT(V.*)) |
| MAX(T · C) | MAX(MAX(T · C)) |
| MIN(T · C) | MIN(MIN(T · C)) |

The Eager Count Transformation is beneficial for TPC-H Query 5. The original TPC-H Query 5 is shown in Table 7. The transformed TPC-H Query 5 is shown in Table 8.

TABLE 7

TPC-H Benchmark Query 5

```
SELECT     /* Q5 */ n_name , SUM(l_extendedprice * (1 –
           l_discount)) as revenue
FROM       customer, orders, lineitem, supplier, nation, region
WHERE      c_custkey = o_custkey and l_orderkey = o_orderkey
           and l_suppkey = s_suppkey and c_nationkey = s_nationkey
           and s_nationkey = n_nationkey and n_regionkey =
           r_regionkey
           and r_name = 'ASIA'
           and o_orderdate >= to_date('1994-01-01', 'YYYY-
           MM- DD')
           and o_orderdate < add_months(to_date('1994-01-01',
           'YYYY-MM-DD'), 12)
GROUP BY n_name
ORDER BY revenue desc;
```

TABLE 8

TPC-H Benchmark Query 5 with SFG transformation applied

```
SELECT     /* Q5   SFG */ V.n_name,
           SUM(l_extendedprice * (1 – l_discount) * V.CN) AS
           revenue
FROM       customer, orders, lineitem,
           (SELECT /* + NO MERGE */   CCUNT(*) AS CN, n_name,
                    s_nationkey, s_suppkey
           FROM     supplier, nation, region
           WHERE    s_nationkey = n_nationkey and
                    n_regionkey = r_regionkey and r_name =
                    'ASIA'
           GROUP BY n_name, s_nationkey, s_suppkey) V
WHERE      c_custkey = o_custkey and o_orderkey = l_orderkey and
           o_orderdate >= to_date('1994-01-01', 'YYYY-MM-DD') and
           o_orderdate < add_months (to_date('1994-01-01', 'YYYY-
           MM-DD'), 12) and c_nationkey = V.s_nationkey and
           l_suppkey = V.s_suppkey
GROUP BY V.n_name
ORDER BY revenue desc
```

The following are observed of Query 5 from Tables 7 and 8:

Query blocks
  The original Query 5, shown in Table 7, references the tables customer, orders, lineitem, supplier, nation, region in one query block.
  The transformed Query 5, shown in Table 8, has an inner query block that references supplier, nation, region. The outer query block joins the inner query block with the tables customer, orders, lineitem.

Decomposed aggregation function
  The original aggregation function of original Query 5 is SUM(l_extendedprice*(1−l_discount)).
  It gets decomposed into SUM(l_extendedprice*(1−l_discount)*V.CN, in the transformed Query 5.

Another candidate for the Eager Count Transformation is TPC-H Query 16. The original TPC-H Query 16 is shown in Table 9. The transformed TPC-H Query 16 is shown in Table 10.

TABLE 9

TPC-H Benchmark Query 16

SELECT /* Q16 */ p_brand, p_type, p_size,
    COUNT(DISTINCT ps_suppkey) as supplier_cnt
FROM partsupp, part
WHERE p_partkey = ps_partkey and p_brand <> 'Brand#45'
    and p_size in (49, 14, 23, 45, 19, 3, 36, 9)
    and p_type not like 'MEDIUM_ POLISHED%'
    and ps_suppkey NOT IN
        (SELECT s_suppkey FROM supplier
         WHERE s_comment like '%Customer%Complaints%')
GROUP BY p_brand, p_type, p_size
ORDER BY supplier_cnt desc, p_brand, p_type, p_size

TABLE 10

TPC-H Benchmark Query 16 with SFG transformation applied

SELECT /* Q16 SFG */ p_brand, p_type, p_size, SUM(V.scnt
    as supplier_cnt
FROM part,
    (SELECT COUNT( DISTINCT ps_suppkey) as sent, ps_partkey
     FROM partsupp
     WHERE ps_suppkey NOT IN
         (SELECT s_suppkey
          FROM supplier
          WHERE s_comment like
          '%Customer%Complaints%')
     GROUP BY ps_partkey) V
WHERE p_partkey = V.ps_partkey and p_brand <> 'Brand#45'
    and p_type not like 'MEDIUM_ POLISHED %'
    and p_size in (49, 14, 23, 45, 19, 3, 36, 9)
GROUP BY p_brand, p_type, p_size
ORDER BY supplier_cnt desc, p_brand, p_type, p_size The following are observed of Query 16 from Tables 9 and 10:
  Query blocks
    The original Query 16 references the tables partsupp, part in one query block.
    The transformed Query 16 has an inner query block that references partsupp. The outer query block joins the inner query block with the tablepart.
  Decomposed aggregation function
    The original aggregation function of original Query 16 is count(distinct (ps_suppkey)).
    It gets decomposed into sum(count(distinct ps_suppkey)), in the transformed Query 16.

Combined Coalesced and Factored Grouping (CCFG)—Double Eager

The Double Eager Transformation, also referred to as Combined Coalesced and Factored Grouping (CCFG), performs the eager count aggregation on tables not containing aggregation columns and eager group-by on the remaining tables which may or may not contain aggregation columns.

Table 11 shows how aggregation functions can be decomposed for the Double Eager Transformation. Here, T refers to the input of the join that is not being pre-aggregated. The set V2 denotes the set of tables the early count aggregation is applied on.

TABLE 11

Aggregation Functions for the Double Eager Transformation

| Aggregation Function | Decomposed Aggregation Function |
|---|---|
| SUM(T · C) | SUM(SUM(T · C) * COUNT(V2.*)) |
| COUNT(T · C) | SUM(COUNT(T · C) * COUNT(V2.*)) |
| COUNT(*) | SUM(COUNT(V1.*) * COUNT(V2.*)) |
| AVG(T · C) | SUM(SUM(T · C) * COUNT(V2.*))/ SUM(COUNT(T · C) * COUNT(V2.*)) |
| MAX(T · C) | MAX(MAX(T · C)) |
| MIN(T · C) | MIN(MIN(T · C)) |

The Double Eager Transformation is beneficial for TPC-H Query 9. The original Query 9 is shown in Table 12. The transformed Query 9 is shown in Table 13.

TABLE 12

TPC-H Benchmark Query 9

SELECT  /* Q9 */ nation, o_year, SUM(amount) as sum_profit
FROM (SELECT n_name as nation,
    to_number(to_char(o_orderdate, 'yyyy')) as o_year,
    l_extendedprice * (1 − l_discount) − ps_supplycost *
    l_quantity as amount
FROM part, lineitem, supplier, nation, partsupp, orders
WHERE s_suppkey = l_suppkey and ps_suppkey = l_suppkey
    and ps_partkey = l_partkey and p_partkey = l_partkey
    and o_orderkey = l_orderkey and s_nationkey =
    n_nationkey
    and p_name like '%green%') profit
GROUP  BY  nation, o_year
ORDER  BY  nation, o_year desc

TABLE 13

TPC-H Benchmark Query 9 with CCFG transformation applied

SELECT /* Q9CCFG */ V2.nation, V1.o_year,
    SUM(V1.sum_profit * V2.cnt) as sumprofit
FROM  (SELECT  /* + no_merge */
    SUM(l_extendedprice * (1 − l_discount ) −
    ps_supplycost * l_quantity) as sum_profit,
    to_number(to char(o_orderdate, 'yyyy')) as o_year,
    s_nationkey
FROM part, lineitem, partsupp, orders, supplier
WHERE ps_suppkey = l_suppkey and ps_partkey = l_partkey
    and p_partkey = l_partkey and o_orderkey =
    l_orderkey
    and s_suppkey = l_suppkey and p_name like
    '%green%'
GROUP BY to_number(to_char(o_orderdate, 'yyyy')),
    s_nationkey) V1,
    (SELECT /* + no_merge */
    n_nationkey, n_name as nation, COUNT(*) as cnt
FROM nation
GROUP BY n_nationkey, n_name) V2
WHERE V1.s_nationkey = V2.n_nationkey
GROUP BY V2.nation, V1.o_year
ORDER BY V2.nation, V1.o_year desc The following are observed of Query 9 from Tables 12 and 13.
  Query blocks
    The original Query 9 references the tables part, lineitem, supplier, nation, partsupp, orders in one query block.
    The transformed Query 9 has two inner query blocks. The query block referred to as V1 references the tables part, lineitem, partsupp, orders, supplier. The second query block referred as V2 references the table nation. The outer query block joins the two inner query blocks V1 and V2.

Decomposed aggregation function

The original aggregation function is sum(1_extendedprice*(1−1_discount)−ps_supplycost*1_quantity).

It gets decomposed into sum(sum(1_extendedprice*(1−1_discount)−ps_supplycost*1_quantity)*count (*)).

Decomposable Aggregation Functions

Techniques described herein stem from the observation that decomposability of an aggregation function allows for a partial aggregation during the early aggregation step. As such, since there will be a final aggregation, the early aggregation is not required to pre-aggregate each and every group.

The definition of a decomposable aggregation function is as follows:

(Def. 1) An aggregation function F is decomposable if there exist aggregation functions $F_1$ and $F_2$ such that $F(S_1 \cup_A S_2) = F_2(F_1(S_1), F_1(S_2))$, where $S_1$ and $S_2$ are two multisets of values and $\cup_A$ denotes a multi-set union that preserves duplicates (UNION ALL) $S_1$ and $S_2$ are referred to as partial groups.

According to the above definition, F can be computed independently on arbitrary sub-multisets of S and the partial results can be aggregated in a final step in order to yield the final and correct result. The following aggregation functions are decomposable:

$$\text{sum}(S_1 \cup_A S_2) = \text{sum}(\text{sum}(S_1), \text{sum}(S_2)) \quad \text{(Eq. 1)}$$

$$\text{count}(S_1 \cup_A S_2) = \text{sum}(\text{count}(S_1), \text{count}(S_2)) \quad \text{(Eq. 2)}$$

$$\text{min}(S_1 \cup_A S_2) = \text{min}(\text{min}(S_1), \text{min}(S_2)) \quad \text{(Eq. 3)}$$

$$\text{max}(S_1 \cup_A S_2) = \text{max}(\text{max}(S_1), \text{max}(S_2)) \quad \text{(Eq. 4)}$$

In case there are no null values or a count implementation that ignores nulls, the avg aggregation function can also be decomposed:

$$\text{avg}(S_1 \cup_A S_2) = \text{sum}(\text{sum}(S_1), \text{sum}(S_2)) / \text{sum}(\text{count}_{no\ nulls}(S_1), \text{count}_{no\ nulls}(S_2)) \quad \text{(Eq. 5)}$$

As discussed above, cardinality estimates are often not accurate enough and not available in a granularity necessary for deciding where and if to place a pre-aggregation. However, pre-aggregation is often an extremely powerful optimization technique but, in some cases, produces a notable execution overhead when compared to a QEP that avoids pre-aggregation.

Determining when pre-aggregation produces a noticeable execution overhead helps make another observation. The execution costs of an early group by operation can be compared with the execution cost savings of subsequent operations that benefit from the cardinality reduction caused by the pre-aggregation. This pertains to all the join operators that follow, including the final group-by, denoted as $F_2$ in the above definition. As such, the deciding factor is the reduction in cardinality or, more precise, the ratio of number of distinct values with the input cardinality of the early group by.

With that in mind, another observation is that an early group by becomes ineffective if the number of distinct values of its grouping column(s) is too high when compared with the cardinality of the input.

Accordingly, a motivation is to implement a fallback mechanism that is triggered when an early group-by becomes too ineffective. Additional cost overheads may be avoided by switching the early group by to a form of a pass-through operation.

Referring to the above definition, decomposability means the ability of splitting an aggregation function into different pre-aggregation steps, followed by a final aggregation step. By redefining $F_2$ for partial groups, the above definition can be extended to partial pre-aggregation.

Partial Group By

As discussed above, partial pre-aggregation is possible when decomposing an aggregation function that is decomposable according to Def. 1. A group by operator that is modified or configured for partial pre-aggregation is referred to herein as a partial group by operator.

In an embodiment, partial group by involves partial groups only of size one. Multisets $S_x$ are either complete groups or partial groups of size one. For the partial groups of size one, the aggregation function $F_2$ is redefined as follows:

if $|S_x|=1$, then $\text{sum}(S_x)=c$, where $c \in S_x$ holds
if $|S_x|=1$, then $\text{count}(S_x)=1$
if $|S_x|=1$, then $\text{min}(S_x)=c$, where $c \in S_x$ holds
if $|S_x|=1$, then $\text{max}(S_x)=c$, where $c \in S_x$ holds In other words, the partial groups will only contain one tuple. For a given aggregation column c, each of sum, min and max is assigned to exactly the value of c. Further, count is set to 1 since the partial group contains exactly one tuple.

FIG. 1 illustrates an exemplary execution process 100 of a partial group by operator according to an embodiment. At block 105, the partial group by operator monitors the number of distinct values ndv it has encountered already.

If the number of distinct values ndv has not yet reached a certain threshold of an aggregation data structure, then, at block 110, the normal group by operation is performed on a tuple being processed. An aggregation data structure stores accumulated aggregation values for each of a set of grouping values and may be accessed using a grouping value as a key. An example of an aggregation data structure is a hash table associated with a hash function. The hash function is applied to the grouping value to generate a hashing value or index that identifies a hash bucket; the hash bucket holds aggregation values for the grouping values that the hashing function resolves to the hash value. Another example of an aggregation data structure is an array. A grouping value is a grouping code, such as an integer that correspond to a grouping key string value. The grouping code identifies an index of the array at which an accumulated aggregation value for the grouping code is stored. In an embodiment, the grouping column value c is recorded in the hash table, if not already there, and the corresponding values of the aggregation functions count, sum, min and max are updated in a hash bucket corresponding to the grouping column value c.

If the number of distinct values ndv reaches the threshold, then, at block 115, it is determined whether the tuple is a new grouping. The tuple is a new grouping if the grouping column value c is not recorded in the hash table.

If the tuple is determined to be a new grouping at block 115, then, at block 120, a fallback mechanism is triggered. The fallback mechanism prevents the new distinct value c from being inserted into the hash table. Instead, the tuple is passed through. In other words, the tuple is written out as a result of the partial group by operator. For aggregation functions sum, min and max, the value of c is written out. For aggregation function count, 1 is written out.

If the tuple is determined not to be a new grouping at block 115, then, at block 110, the normal group by operation is performed on the tuple. The corresponding values of the aggregation functions count, sum, min and/or max are updated in the hash bucket corresponding to the grouping column value c.

When the threshold is defined according to the availability of main memory for the partial group by, there will not be any need to spill to disk, thereby minimizing the execution overhead of the group by.

The aggregation data structure (e.g., hash table) is maintained in main memory to avoid disk spill. As such, the aggregation data structure is a fixed sized, pre-allocated data structure.

In an embodiment, process 100 of FIG. 1 may be modified to implement one or more different cache replacement policies to make space in or free up the data structure. Exemplary cache replacement policies are First in First out (FIFO), Last in Last out (LIFO), Least Recently Used (LRU), Most Recently Used (MRU), Least Frequently Used (LFU), Least Frequently Recently Used (LFRU), etc.

FIG. 2 illustrates another exemplary execution process 200 of a partial group by operator according to an embodiment.

At block 205, a hash value of a grouping column c associated with a tuple being processed, is computed.

Based on the hash value determined at block 205, if the grouping column c is not yet recorded in a hash table, then, at block 210, the normal group by operation is performed on the tuple being processed. In an embodiment, block 210 assumes that the number of distinct values ndv has not yet reached the threshold of the hash table.

If the grouping column c is recorded in the hash table, then, at block 215, it is determined whether c is present among all hash collisions in the hash bucket corresponding to the hash value of the grouping column c.

If c is present, then at block 210, the normal group by operation is performed on the tuple. The corresponding values of the aggregation functions count, sum, min and/or max are updated in the hash bucket corresponding to the grouping column value c.

If c is not present, then at block 220, the grouping column c is recorded as an entry in the hash bucket and the initial values for the aggregation functions count, sum, min and/or max are computed according to the above described rules of partial groups of size one.

At block 225, another entry c' is evicted from the hash bucket according to a predetermined cache replacement policy. When grouping column c' is evicted, its corresponding tuple is written out with the latest value for the corresponding aggregation function. Block 220 and block 225 may be performed simultaneously, or block 225 may be performed before block 220.

The evicted grouping column c' may be reintroduced to the hash table at some later point. In such a case, its aggregation function result is reset according to the above described rules of partial groups of size one.

As demonstrated, the partial group by may be used to modify a QEP generator to favor Eager Group By placement by enforcing more Eager Group By placement plans while lowering the risk of bad plans.

Example Method of a Modified Group by Operator

FIG. 3 illustrates a method 300 of a partial group by operator according to an embodiment. Method 300 describes a generalized method of processes 100 of FIG. 1 and 200 of FIG. 2.

The method 300 begins at step 302, where a query execution plan is generated. The query execution plan may be generated during runtime and includes a first group by operator and second group by operator. For example, the first group by operator is an eager (or early or inner) group by operator that is modified to implement a fallback mechanism and aggregates rows in an aggregation data structure, and the second group by operator is a final (or outer) group by operator that aggregates an aggregation output of the first group by operator. The modified eager group by operator is referred to as a partial group by operator. An example aggregation data structure is a hash table or array.

After the query execution plan is generated, the first group by operator is executed. At step 304, a first plurality of rows is aggregated by a first plurality of grouping values. The aggregation data structure stores the plurality of grouping values. In an embodiment, the first plurality of rows is aggregated when one or more fallback criteria that are based on the aggregation data structure are determined not to be satisfied. In an embodiment, when the fallback criteria are satisfied, a fallback mechanism is triggered to pass a value of a grouping column through such that the cardinality grouping values or entries of the aggregation data structure is unchanged. For example, a current row or tuple being processed may be passed through or written out as a result without including it as a new entry in the aggregation data structure. For another example, a latest value of an entry evicted from the aggregation data structure is passed through or written out as a result such that another row or tuple may be included as a new entry in the aggregation data structure without increasing the cardinality of grouping values in the aggregation data structure.

At step 306, the one or more fallback criteria that are based on the aggregation data structure are determined to be satisfied.

At step 308, in response to determining that the one or more fallback criteria that are based on the aggregation data structure are satisfied, a second row is included in the aggregation output of the first group by operator without including an aggregation value for a second grouping value for the second row to the aggregation data structure. In an embodiment, the first plurality of grouping values does not include the second grouping value.

In an embodiment, unlike the second row, the first plurality of rows is aggregated in response to determining that the one or more fallback criteria that are based on the aggregation data structure are not satisfied.

In an embodiment, prior to step 306, the grouping value for the second row is determined not to be included in the aggregation data structure. When the one or more fallback criteria are satisfied, including a number of distinct values associated with the aggregation data structure reaching a threshold, at step 308, the second grouping value for the second row is output by the first group by operator without including the aggregation value for the second grouping value in the aggregation data structure.

In an embodiment, prior to step 306, a hash value of a third grouping value for a third row is determined to be included in the aggregation data structure. When the one or more fallback criteria are satisfied, including the third grouping value not being included in the aggregation data structure, at step 308, an entry is evicted from the aggregation data structure according to a cache replacement policy. The entry being evicted is associated with the second grouping value. The eviction of the second grouping value is to make room in the aggregation data structure. At step 308, an entry for the third grouping value is included in the aggregation data structure and an aggregation value for the grouping value for the third row is computed. Example cache replacement policy is First in First out (FIFO), Last in Last out (LIFO), Least Recently Used (LRU), Most Recently Used (MRU), Least Frequently Used (LFU), or Least Frequently Recently Used (LFRU). The second grouping value may be reintroduced into the aggregation data structure the next time it is encountered.

Database Overview

Embodiments of the present invention are used in the context of database management systems (DBMSs). Therefore, a description of an example DBMS is provided.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g., to store rows of a table, to store column values of a column). When records are read from persistent storage, a database block containing the record is copied into a database block buffer in volatile memory of a database server. A database block usually contains multiple rows, and control and formatting information, (e.g., offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A data block may be associated with a data block address that uniquely identifies the data block and the data block's storage location within a storage device. A database server may request from a storage device a data block by data block address, or even by primary block address ranges of data blocks.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Optimization and Execution Plans

When a database server receives the original statement of a database command, the database server must first determine which actions should be performed to execute the database command, and then perform those actions. The act of preparing for performance of those actions is generally referred to as "compiling" the database command, while performing those actions is generally referred to as "executing" the database command. During the compilation of a query statement, the database server may perform a significant amount of preliminary work for the statement, such as parsing, semantic analysis, and execution plan generation.

A database command submitted to a database server goes through a query compilation phase where the database command is parsed and optimized. Query optimization selects an optimal execution plan which is then passed on to a query execution engine as a query execution plan to be executed during runtime.

Query optimization generates one or more different candidate execution plans for a database command, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, a full outer join, and importantly, a partial group by operator.

A query optimizer may optimize a database command by transforming the database command. In general, transforming a data command involves rewriting a database command into another semantically equivalent database command that should produce the equivalent result and that can potentially be executed more efficiently, i.e. one for which a potentially more efficient and less costly execution plan can be generated. Examples of query transformations include view merging, subquery unnesting, predicate move-around and push-down, common subexpression elimination, outer-to-inner join conversion, materialized view rewrite, and star transformation.

Hardware Overview

Figure 4:
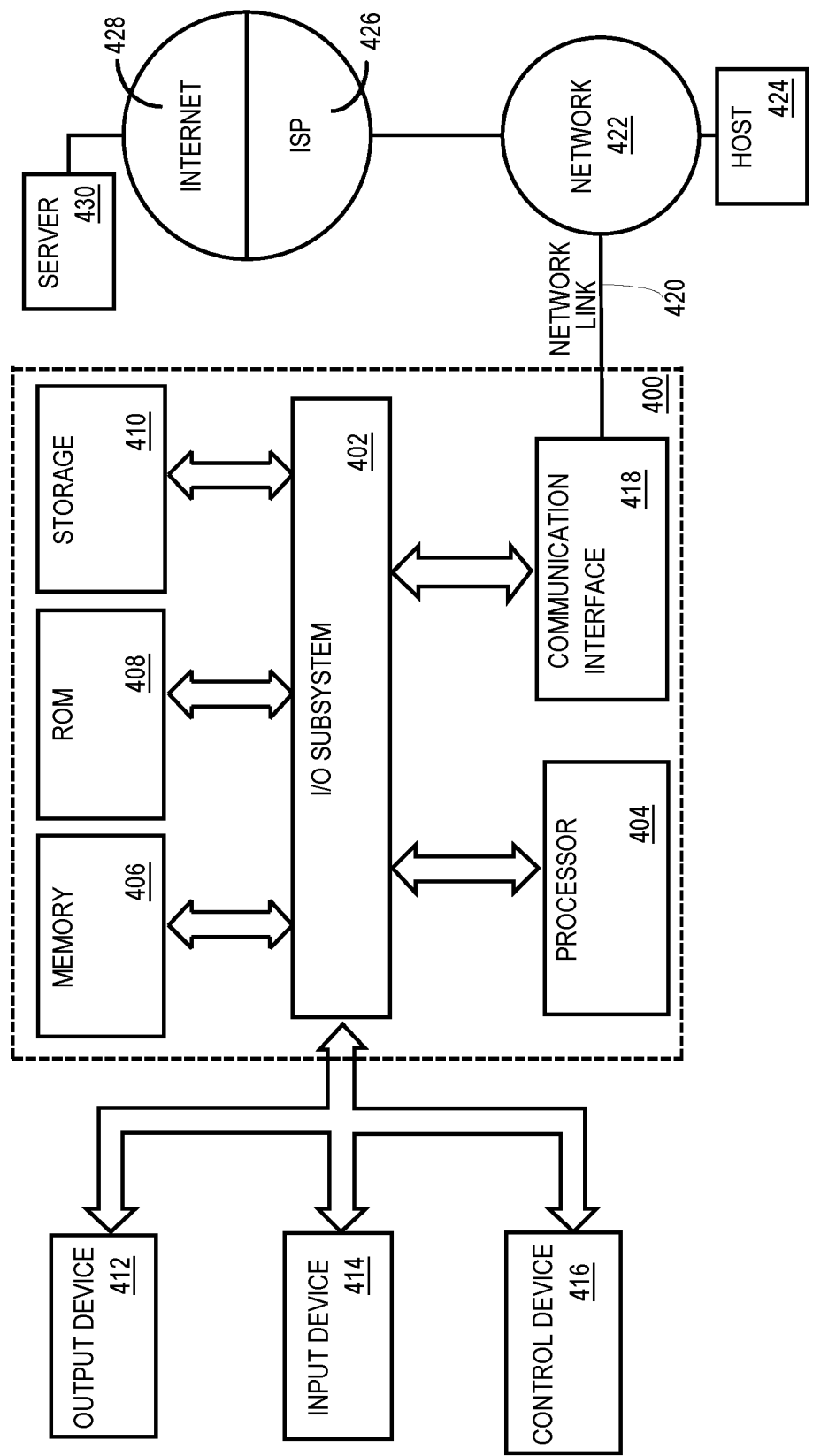
FIG. 4 illustrates a block diagram of a computing device in which the example embodiment(s) of the present invention may be embodiment.

Referring now to FIG. 4, it is a block diagram that illustrates a basic computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or other processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

Software Overview

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   generating a query execution plan comprising a first group by operator and second group by operator, wherein aggregation output of said first group by operator is aggregated by said second group by operator, wherein the first group by operator performs partial pre-aggregation for a decomposed aggregate function;
   wherein said first group by operator aggregates rows in an aggregation data structure;
   executing said first group by operator, wherein executing said first group by operator includes:
      aggregating a first plurality of rows by a first plurality of grouping values, wherein said aggregation data structure stores a respective one or more aggregation values for each grouping value of said first plurality of grouping values;
      determining that a second grouping value for a second row is not included in the aggregation data structure;
      in response to determining that a second grouping value for a second row is not included in the aggregation data structure, determining that one or more fallback criteria that are based on said aggregation data structure are satisfied;
      in response to determining that the one or more fallback criteria that are based on said aggregation data structure are satisfied, including the second row in the aggregation output of said first group by operator without including an aggregation value for the second grouping value in said aggregation data structure.

2. The method of claim 1, wherein the first plurality of grouping values does not include the second group value.

3. The method of claim 1, wherein aggregating a first plurality of rows by a first plurality of grouping values is performed when the one or more fallback criteria that are based on the aggregation data structure are not satisfied.

4. The method of claim 1, wherein the one or more fallback criteria include a number of distinct values associated with the aggregation data structure has reached a threshold.

5. The method of claim 1, wherein executing said first group by operator further includes, prior to determining that the one or more fallback criteria that are based on the aggregation data structure are satisfied, determining that a third grouping value for a third row is included in the aggregation data structure.

6. The method of claim 5, wherein the one or more fallback criteria include the third grouping value is not included in the aggregation data structure.

7. The method of claim 6, wherein executing said first group by operator further includes:
   evicting a different entry from the aggregation data structure according to a cache replacement policy;
   including an entry for the third grouping value in the aggregation data structure;
   computing an aggregation value for the third grouping value for the third row.

8. The method of claim 7, wherein the cache replacement policy is First in First out (FIFO), Last in Last out (LIFO), Least Recently Used (LRU), Most Recently Used (MRU), Least Frequently Used (LFU), or Least Frequently Recently Used (LFRU).

9. The method of claim 7, wherein the different entry being evicted is associated with the second grouping value.

10. One or more non-transitory computer-readable storage medium storing instructions that, when executed by one or more processors, cause the one or more processors to perform functions comprising:
   generating a query execution plan comprising a first group by operator and second group by operator, wherein aggregation output of said first group by operator is aggregated by said second group by operator, wherein the first group by operator performs partial pre-aggregation for a decomposed aggregate function;
   wherein said first group by operator aggregates rows in an aggregation data structure;
   executing said first group by operator, wherein executing said first group by operator includes:
      aggregating a first plurality of rows by a first plurality of grouping values, wherein said aggregation data structure stores a respective one or more aggregation values for each grouping value of said first plurality of grouping values;
      determining that a second grouping value for a second row is not included in the aggregation data structure;
      in response to determining that a second grouping value for a second row is not included in the aggregation data structure, determining that one or more fallback criteria that are based on said aggregation data structure are satisfied;
      in response to determining that the one or more fallback criteria that are based on said aggregation data structure are satisfied, including the second row in the aggregation output of said first group by operator without including an aggregation value for the second grouping value in said aggregation data structure.

11. The one or more non-transitory computer-readable storage medium of claim 10, wherein the first plurality of grouping values does not include the second group value.

12. The one or more non-transitory computer-readable storage medium of claim 10, wherein aggregating a first plurality of rows by a first plurality of grouping values is performed when the one or more fallback criteria that are based on the aggregation data structure are not satisfied.

13. The one or more non-transitory computer-readable storage medium of claim 10, wherein the one or more fallback criteria include a number of distinct values associated with the aggregation data structure has reached a threshold.

14. The one or more non-transitory computer-readable storage medium of claim 10, wherein executing said first group by operator further includes, prior to determining that the one or more fallback criteria that are based on the aggregation data structure are satisfied, determining that a third grouping value for a third row is included in the aggregation data structure.

15. The one or more non-transitory computer-readable storage medium of claim 14, wherein the one or more fallback criteria include the third grouping value is not included in the aggregation data structure.

16. The one or more non-transitory computer-readable storage medium of claim 15, wherein executing said first group by operator further includes:
   evicting a different entry from the aggregation data structure according to a cache replacement policy;
   including an entry for the third grouping value in the aggregation data structure;
   computing an aggregation value for the third grouping value for the third row.

17. The one or more non-transitory computer-readable storage medium of claim 16, wherein the cache replacement policy is First in First out (FIFO), Last in Last out (LIFO), Least Recently Used (LRU), Most Recently Used (MRU), Least Frequently Used (LFU), or Least Frequently Recently Used (LFRU).

18. The one or more non-transitory computer-readable storage medium of claim 16, wherein the different entry being evicted is associated with the second grouping value.

* * * * *